United States Patent [19]

Prochazka

[11] 4,209,474

[45] * Jun. 24, 1980

[54] PROCESS FOR PREPARING SEMICONDUCTING SILICON CARBIDE SINTERED BODY

[75] Inventor: Svante Prochazka, Ballston Lake, N.Y.

[73] Assignee: General Electric Company, Schenectady, N.Y.

[ * ] Notice: The portion of the term of this patent subsequent to Jan. 25, 1994, has been disclaimed.

[21] Appl. No.: 10,515

[22] Filed: Feb. 9, 1979

Related U.S. Application Data

[63] Continuation of Ser. No. 829,454, Aug. 31, 1977, abandoned, which is a continuation-in-part of Ser. No. 681,706, Apr. 29, 1976, abandoned, which is a continuation-in-part of Ser. No. 573,777, May 1, 1975, abandoned.

[51] Int. Cl.² .................... C04B 35/56; C04B 35/58; C04B 35/64
[52] U.S. Cl. .................... 264/29.5; 106/44; 252/62.3 C; 252/504; 252/516; 264/29.6; 264/65; 264/125

[58] Field of Search ............ 252/62.3 C, 504, 516; 106/44; 264/65, 29.5, 29.6, 125

[56] References Cited

U.S. PATENT DOCUMENTS

| | | | |
|---|---|---|---|
| 3,615,930 | 10/1971 | Knippenberg et al. | 252/62.3 C |
| 3,853,566 | 12/1974 | Prochazka | 106/44 |
| 3,926,857 | 12/1975 | Matkin et al. | 106/44 X |
| 3,954,483 | 5/1976 | Prochazka | 106/44 |
| 3,960,577 | 6/1976 | Prochazka | 106/44 |
| 3,966,855 | 6/1976 | Hollenberg et al. | 106/44 X |
| 4,004,934 | 1/1977 | Prochazka | 264/65 X |
| 4,133,689 | 1/1979 | Stroke | 106/44 |

*Primary Examiner*—Jack Cooper
*Attorney, Agent, or Firm*—Jane M. Binkowski; James C. Davis, Jr.; Leo I. MaLossi

[57] ABSTRACT

A silicon carbide sintered body exhibiting N-type semiconductivity is produced by shaping a mixture of β-silicon carbide, boron additive and a carbonaceous additive into a green body and sintering the body in an atmosphere containing nitrogen to produce a sintered body having a density of at least about 90% and pores which are substantially non-interconnecting.

2 Claims, 2 Drawing Figures

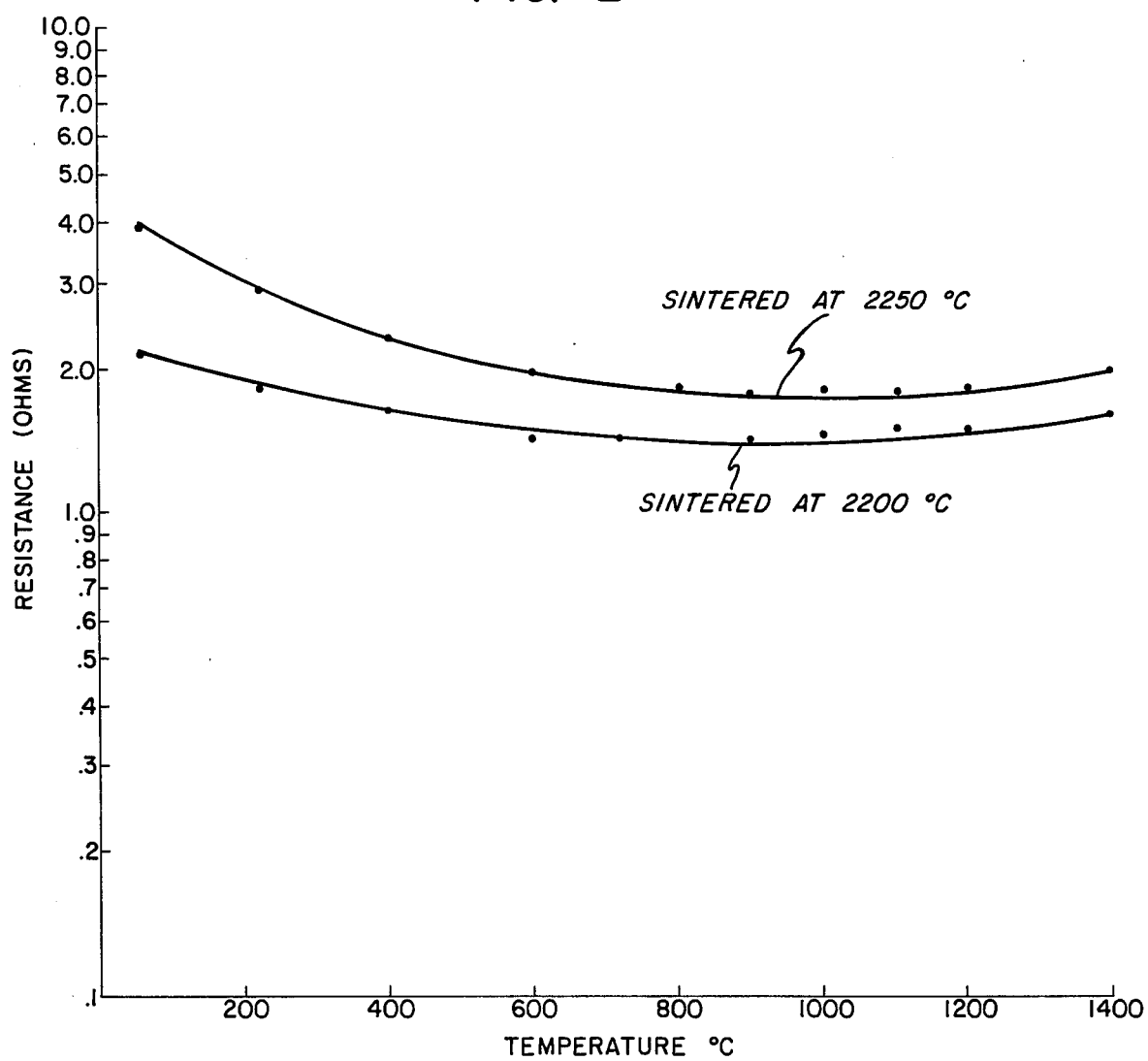

PROCESS FOR PREPARING SEMICONDUCTING SILICON CARBIDE SINTERED BODY

The invention herein described was made in the course of or under a contract or subcontract thereunder (or grant) with the Department of the Nacy.

This is a continuation of Ser. No. 829,454, filed Aug. 31, 1977, now abandonded, which is a continuation-in-part of Ser. No. 681,706 filed Apr. 29, 1976, now abandoned, which is a continuation-in-part of Ser. No. 573,777, filed May 1, 1975, now abandoned.

Polycrsytalline SiC has been used for electrical components fabrication such as resistors, varistors and heating element. All these applications are based on the bulk electrical properti which result after consolidation of the SiC grit or power into a ceramic. The consolidation process deeply affects the electrical properties, mainly by barrier and other effects between grains, by impurities and other limitations imposed by the fabrication process. Thus, semiconductive properties known from the behavior os SiC single crystals are rarely observed in polycrystalline SiC ceramics because other effects dominate. Moreover the electrical properties cannot be usually controlled during the fabrication process.

Thus for instance on reaction sintering the residual silicon and carbon control the resistance and make the electrical properties unstable at high temperatures. Hot-pressing of SiC into dense bodies requires additions such as alumina, aluminum or boron which enter the SiC lattice, introduce acceptor sites and determine the electronic properties. Other consolidation methods as clay bonding or recrystallization yield porous materials which may be applied only up to limited temperatures above which they deteriorate by oxidation.

Chemical vapor deposition is also not suitable for the preparation of dense SiC with controlled electrical properties as the necessary constituents to be introduced into the lattice such as boron, nitrogen or phosphorous, affect the delicate processes during the formation of SiC from the vapor phase. It is also a very lengthy and costly process which cannot be scaled up to mass production at the present state-of-the-art.

In my copending application, Ser. No. 409,073, filed Oct. 24, 1973, now abandoned there is disclosed a method of making a silicon carbide ceramic by forming a mixture of submicron powder composed of silicon carbide, a boron additive and free carbon, shaping the mixture into a green body and sintering the green body in an atmosphere in which it is substantially inert at a sintering temperature of about 1900–2100° C. to produce a sintered silicon carbide body having a density of at least 85%, and preferably 98%, of the theoretical density for silicon carbide which is 3.21 grams per cubic centimeter. The disclosed sintering atmospheres include argon, helium and hydrogen as well as nitrogen and a mixture of nitrogen and a rare gas. Also, copending application Ser. No. 409,073 discloses that the nitrogen atmosphere has an additional effect on the sintered silicon carbide in that it induces electrical conductivity by introducing N-type semiconductivity, that the degree of conductivity is proportional to the nitrogen pressure on sintering, and that by monitoring the nitrogen pressure in the furnace, it is possible to prepare polycrystalline SiC with a resistivity range from $10^4$ ohm-cm typical for nitrogen free sintering atmospheres to $10^{-1}$ ohm-cm typical for an atmosphere of 760 torr $N_2$.

The present invention relates to the production of a semiconducting N-type sintered polycrystalline silicon carbide body having predetermined electrical properties. In accordance with the present invention, using the sintering process for consolidation of SiC into dense bodies, the electrical properties of the sintered product can be controlled by monitoring the pressure of nitrogen in the sintering atmosphere and the composition and properties of the resulting sintered product. As a result, a polycrystalline SiC can be produced which has essentially the same resistance characteristics as doped SiC single crystals but in contrast to it can be made into sizeable and complex shaped articles which are impervious and substantially stable in air at very high temperatures.

Briefly stated, the process of the present invention comprises providing a substantially homogeneous particulate dispersion or mixture, wherein the particles are submicron in size, of $\beta$-silicon carbide, boron additive and a carbonaceous additive which is free carbon or a carbonaceous organic material which is heat-decomposible to produce free carbon, shaping the mixture into a green body, and sintering the green body at a temperature ranging from 2000° C. to 2300° C., preferably from about 2180° C. to 2300° C., in an atmosphere containing a certain pressure of nitrogen to produce a sintered body having a density of at least 90% of the theoretical density for silicon carbide and one wherein the pores are substantially non-interconnecting.

Those skilled in the art will gain a further and better understanding of the present invention from the detailed description set forth below, considered in conjunction, in which:

FIG. 2 shows the logarithm of resistance in ohms of the present sintered bodies as a function of temperature and shows that the present sintered bodies have an electrical resistance with a positive temperature coefficient at temperatures ranging from about 800° C. on up.

Figure 1:
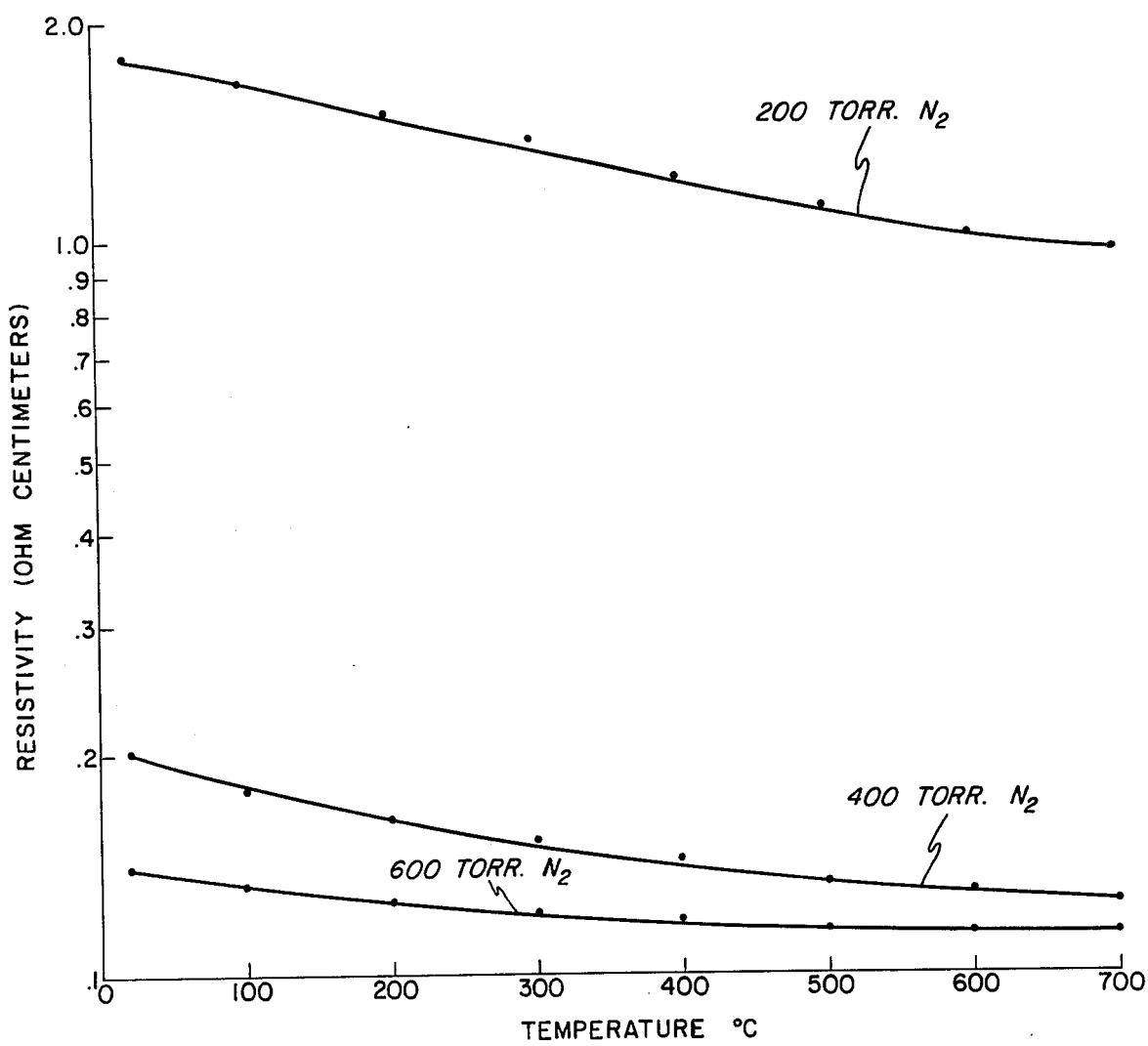
FIG. 1 shows the logarithm of resistivity in ohm centimeters as a function of temperature and also illustrates the effect of nitrogen pressure in the sintering atmosphere on resistivity.

In carrying out the present process, a substantially homogeneous particulate mixture of silicon carbide, boron additive and carbonaceous additive is prepared and shaped into a green body. Specifically, the silicon carbide powder consists essentially of the $\beta$-phase and less than 1% by weight of the $\alpha$-phase. These phases are readily determined by standard X-ray procedures. Amounts of the $\alpha$-phase in excess of 1% by weight usually coarsen the structure of the body significantly during sintering preventing densification and the production of a sintered body having a density of at least 90%. For best results single phase $\beta$-silicon carbide powder is used.

It is essential that the powder or particles in the mixture be submicron in size in order to obtain high densities and strengths upon sintering. Silicon carbide powder of submicron size can be prepared by a number of techniques as, for example, by direct synthesis from the elements, by reduction of silica, or by pyrolysis of compounds containing silicon and carbon.

A number of processes which involve the pyrolysis of compounds containing silicon and carbon are particularly advantageous since they can be controlled to produce $\beta$-silicon carbide of desired submicron particle size composed mainly of isolated crystallites. Also, these pyrolytic processes can be controlled to produce a carbon-rich silicon carbide powder, e.g. a free carbon-containing β-silicon carbide powder. If such a powder contains the required amount of free carbon of submicron size uniformly distributed therein, it is particularly useful in the present invention since it eliminates the separate step of introducing free carbon. Also, if necessary, such a free carbon-containing powder may be mixed with additional β-silicon carbide powder to produce the required level of free carbon.

In a preferred pyrolytic process trichloromethylsilane vapor and hydrogen or a mixture of $SiCl_4$ vapor and a suitable hydrocarbon vapor, such as toluene, and hydrogen are introduced into an argon plasma generated between two concentric electrodes. In the hot plasma the compounds decompose into ions and the most stable molecules, i.e., SiC and HCl, form on cooling the gases. The β-silicon carbide is prepared as small crystals typically 0.1-0.3μ in size. The advantage of this produce is that the crystallites are not aggregated and that the carbon to silicon ratio can be controlled by monitoring the initial vapor composition so that SiC powders enriched in free carbon of submicron size can be obtained in the desired amount. Moreover, $BCl_3$ can be further added to the reactants in the desired amounts whereby the SiC powders are doped with boron which has been dispersed essentially on a molecular level.

U.S. Pat. No. 3,085,863 discloses another process of preparing submicron silicon carbide powder by forming a silica gel in sugar solution, dehydrating the gel to decompose the sugar and form a finely divided mixture of silica and carbon, and heating the mixture to form silicon carbide. In such a process, a boron compound such as boric acid can be added to the silica gel to produce boron in situ in the resulting silicon carbide powder.

The boron additive in the powder mixture from which the green body is shaped is in the form of elemental boron or boron carbide. In order to obtain significant densification during sintering, the amount of boron additive is critical and is equivalent to about 0.3% to 3.0% by weight of elemental boron, e.g. 0.3 part by weight to 3 parts by weight of elemental boron based on 100 parts by weight of silicon carbide. The particular amount of boron additive used is determinable empirically and depends largely on the degree of dispersion achieved in the mixture since the more thoroughly it is dispersed the more uniform is the density of the sintered product. However, amounts of elemental boron below 0.3% by weight do not result in the necessary degree of densification whereas amounts of elemental boron greater than 3.0% by weight produce no significant additional densification and may deteriorate the oxidation resistance of the product. During sintering, the boron additive enters into solid solution with the silicon carbide. In addition, generally when amounts of the additive in excess of that equivalent to about 1% by weight of elemental boron are used, a boron carbide phase also precipitates.

The carbonaceous additive is used in an amount equivalent to 0.1% by weight to 1.0% by weight of free carbon, e.g. 0.1 part by weight to 1.0 part by weight of free carbon based on 100 parts by weight of silicon carbide. Specifically, the carbonaceous additive is particulate free carbon of submicron size such as, for example, acetylene black, or carbonaceous organic material which is heat-decomposible to produce particulate free carbon of submicron size in the required amount. In addition, the carbonaceous organic material is a solid or liquid at room temperature and completely decomposes at a temperature in the range of about 50° C. to 1000° C. to yield free carbon and gaseous products of decomposition. Also, the carbonaceous organic material is one which has no significant deteriorating effect on the silicon carbide, boron additive or the resulting sintered product.

In order to obtain satisfactory densification, the oxygen content of the silicon carbide powder should be low, preferably less than about 0.2 weight percent. Such oxygen is determinable by standard techniques and generally, it is present largely in the form of silica. Thus, for instance, a β-silicon carbide powder which contained 0.4% by weight boron and no free carbon exhibited on firing at 2020° C. a linear shrinkage of only 5% which corresponds to about 70% final theoretical density. When, however, an addition of carbon was made in the form of a soluble carbonaceous compound prior to compacting, the linear shrinkage increased to 18% and the density was 96% of the theoretical after firing under the same conditions. Thus, clearly, some free carbon is absolutely essential to the sintering of SiC.

The function of free carbon is to reduce silica which always is present in silicon carbide powders in small amounts or which forms on heating from oxygen absorbed on the powder surfaces. Carbon then reacts during heating with the silica according to the reaction: $SiO_2 + 3C = SiC + 2Co$. Silica, when present in the SiC powders in appreciable amounts, halts densification of silicon carbide completely so that little or no shrinkage is obtained.

There is an additional role of the free carbon. It will act as a getter for free silicon if present in the powders or if it is formed by the following reaction during heating up to the sintering temperature: $SiO_2 + 2SiC = 3Si + 2CO$. The presence of silicon, just as the silica, tends to halt or retard densification of SiC and must be eliminated. The specific amount of free carbon required depends largely upon the oxygen content in the starting SiC powder. Thus, for instance, a boron doped powder with an oxygen content of 0.06% sinters easily to 98.5% of the theoretical density with an addition of 0.3% carbon. Another powder containing 0.3% oxygen sinters to 91% relative density with 0.9% free carbon. A substantial excess of particulate free carbon beyond the necessary amount for deoxidation of the SiC is harmful since it functions much like permanent pores in the sintered SiC body thereby limiting the ultimate achievable density and strength. Systematic experiments have shown that 0.1 to 1.0 weight percent of free carbon is sufficient to provide sinterability. The extent of the reaction of elemental carbon in the present process depends on the amount of $SiO_2$ or oxygen as well as free silicon with which it reacts, and such reactions can consume all of the free carbon leaving no detectable free carbon in the final sintered product, but frequently, the sintered product contains about 0.1% to 1% by weight elemental carbon based on the silicon carbide. Green bodies which do not sinter under these conditions will not sinter to high density, i.e. 90%, even when more free carbon is used.

Free carbon in the form of a submicron powder can be admixed with the silicon carbide powder by a number of conventional techniques such as, for example, jet milling or ball milling in a liquid dispersion.

In carrying out the present process, the carbonaceous organic material can be introduced by a number of techniques and heat-decomposed before or after the green body is formed. If the carbonaceous organic material is a solid, it is preferably admixed in the form of a solution with the silicon carbide powder and boron additive to substantially coat the particles. The wet mixture can then be treated to remove the solvent, and the resulting dry mixture can be heated to decompose the carbonaceous organic material producing free carbon in situ before the mixture is formed into a green body. If desired, the wet mixture can be formed into a green body and the solvent removed therefrom. In this way, a substantially uniform coating of the organic material on the silicon carbide powder is obtained which on decomposition produces a uniform distribution of free carbon. The green body is then heated to decompose the carbonaceous organic material to produce free carbon in situ and diffuse away gaseous products of decomposition. The solvent can be removed by a number of techniques such as by evaporation or by freeze drying, i.e. subliming off the solvent in vacuum from the frozen dispersion. Likewise, if the carbonaceous organic material is a liquid, it can be admixed with the silicon carbide powder and boron additive, and the wet mixture heated to decompose the organic material and form free carbon, or the wet mixture can be formed into a green body which is then heated to decompose the organic material to form free carbon in situ and diffuse away gaseous products of decomposition. The heat-decomposition of the carbonaceous organic material should be carried out in an atmosphere in which the components being heated are substantially inert or which has no significant deteriorating effect on the components being heated such as argon, a vacuum and in most instances nitrogen. Preferably, the carbonaceous organic material in the green body is heat-decomposed in the sintering furnace as the temperature is being raised to sintering temperature.

High molecular weight aromatic compounds are the preferred carbonaceous organic materials for making the carbon addition since they ordinarily give on pyrolysis the required yield of particulate free carbon of submicron size. Examples of such aromatic compounds are a phenolformaldehyde condensate-novolak which is soluble in acetone or higher alcohols, such as butyl alcohol, as well as many of the related condensation products, such as resorcinolformaldehyde, aniline-formaldehyde, and cresolformaldehyde. Another satisfactory group of compounds are derivatives of polynuclear aromatic hydrocarbons contained in coal tar, such as dibenzanthracene and chrysene. A preferred group of carbonaceous additives are polymers of aromatic hydrocarbons such as polyphenylene or polymethylphenylene which are soluble in aromatic hydrocarbons and yield on heat-decomposition up to 90% of free carbon.

Another approach to improved carbon distribution on a submicron particle size level is the application of jet milling. The silicon carbide powder is soaked with a solution of, for instance, a novolak resin in acetone, dried in air and heated up to 500° C. to 800° C. in nitrogen to pyrolyze the resin. The actual amount of carbon introduced by this process is determined as weight gain after the pyrolysis or by analysis of free carbon. The powder with the added carbon is then jet milled which greatly improves the distribution of carbon and eliminates major carbon grains in the sintered product.

A number of techniques can be used to shape the powder mixture into a green body. For example, the powder mixture can be extruded, injection molded, die-pressed isostatically pressed or slip cast to produce the green body of desired shape which results in the present pre-shaped sintered body. Any lubricants, binders or similar materials used in shaping the powder mixture should have no significant deteriorating effect on the green body or the resulting sintered body. Such materials are preferably of the type which evaporate on heating at relatively low temperature, preferably below 200° C., leaving no significant residue. The green body, preferably, should have a density of at least 45% of the theoretical density for silicon carbide to promote densification during sintering and achieve attainment of the desired density of at least 90%.

Sintering of the green body is carried out in a flowing atmosphere which contains nitrogen and which has no significant deteriorating effect on its properties. The sintering atmosphere can range from atmosphere pressure to super-atmospheric pressure, but as a practical matter, it is preferably at atmospheric pressure. The nitrogen content of the sintering atmosphere ranges from a partial pressure of $10^{-1}$ atmosphere to a pressure of 5 atmospheres, and preferably from $10^{-1}$ atmosphere to a pressure of one atmosphere. When a partial pressure of nitrogen gas is used, it is metered into the furnace as a mixture with a substantially inert gas such as argon or helium. The specific pressure of nitrogen gas used in the sintering atmosphere depends largely on the semiconductive properties desired in the sintered product. Specifically, as nitrogen gas contacts the body during sintering its atoms are accommodated in the silicon carbide lattice and become entrapped therein in the form of a solid solution. With increasing pressures of nitrogen, therefore, a greater amount of nitrogen is accommodated in the silicon carbide lattice and becomes a solute in the sintered body. A partial pressure of nitrogen smaller than $10^{-1}$ atmoshere results in a sintered product having a P-type semiconductivity.

Sintering is carried out at a temperature ranging from 2000° C. to 2300° C., and preferably from about 2180° C. to 2300° C. The particular sintering temperature is determinable empirically and depends largely on the particle size, density of the green body, nitrogen pressure used in the sintering atmosphere and final density desired in the sintered product. Specifically, the smaller the size of the particles in the green body and the higher its density, the lower is the required sintering temperature. On the other hand, sintering atmospheres with increasing nitrogen content require correspondingly higher sintering temperatures. Also, higher final densities require higher sintering temperatures. Sintering temperatures lower than 2000° C. do not produce sintered bodies with a density of at least 90% and temperatures higher than 2300° C. cause excessive grain growth which may affect the mechanical properties of the sintered product detrimentally.

The pre-shaped sintered product of the present invention, i.e. the body is pre-shaped before sintering, has a density of at least 90%, and preferably at least 95%, of the theoretical density of silicon carbide and has pores which are substantially non-interconnecting. The sintered body is comprised of silicon carbide and from about 0.3 part by weight to 3 parts by weight of boron, based on 100 parts by weight of silicon carbide, in solid solution with the silicon carbide or in solid solution with the silicon carbide and also present as a boron carbide phase. The sintered body has at least a sufficient amount of nitrogen dissolved in its microstructure to impart to it an N-type semiconductivity. The sintered body can be free of detectable free carbon but frequently it contains from about 0.1 to 1 part by weight of free carbon in the form of particles, submicron in size, substantially uniformly dispersed throughout the sintered body. Since the pores of the present sintered body are substantially non-interconnecting they do not assist the diffusion or escape of nitrogen out of the sintered body, therefore, nitrogen remains in solution even at high temperatures, for example of the order of about 2000° C. and also such non-interconnecting pores protect the sintered body against oxidation at high temperatures, up to about 1700° C. in air.

The present process can produce α-SiC, β-SiC or a mixture of α- and β-SiC. The microstructure of α-SiC may vary from substantially non-uniform to substantially uniform. The β-SiC has a fine grain uniform microstructure with a mean average grain size ranging from about one micron to 5 microns, and typically, it is about 3 microns. The type of silicon carbide produced in the sintered product, i.e. α-, β-, or a mixture of α- and β-silicon carbides, depends largely on sintering time, sintering temperature and nitrogen pressure in the sintering atmosphere. These parameters are interrelated. Specifically, α-SiC appears at low nitrogen pressures, high sintering temperatures and extending sintering time periods. For example, sintering at atmospheric pressure but with a low nitrogen pressure of about 0.4 atmosphere along with a sintering temperature of 2300° C. and an extended sintering time period, for example about 1 hour or longer, is likely to produce a substantial amount of α-SiC. However, sintering at atmospheric pressure in one atmosphere $N_2$ at 2300° C. produces β-SiC even with an extended sintering time period of one hour or longer. To insure the formation of β-SiC at lower nitrogen pressures in the present process, it is preferable to use lower sintering temperatures, preferably a sintering temperature of about 2180° C. to about 2250° C., and as short a sintering time period as will permit the attainment of the desired density of at least 90% or higher.

The sintered body of the present invention exhibits an N-type semiconductivity and has an electrical resistivity at a given temperature which is substantially proportional to its nitrogen content, e.g. with increasing nitrogen content its electrical resistivity at a given temperature decreases correspondingly. As used herein resistivity is the resistance in ohms of the present sintered body one centimeter long and one square centimeter in cross-section. Specifically, when the pressure of nitrogen ranges from $10^{-1}$ atmosphere to one atmosphere in the sintering atmosphere, the resulting sintered products exhibit an N-type semiconductivity with an electrical resistivity at room temperature, i.e. 20° C., ranging from 10 ohm cm to $10^{-2}$ ohm cm, respectively, assuming other parameters are constant, and also have an electrical resistance with a positive temperature coefficient at temperatures ranging from about 800° C. to about 2000° C. The positive temperature coefficient of the product indicates that its resistance increases with increasing temperature which means that it has the ability to stabilize current at a constant voltage thereby preventing overheating. In contrast, the electrical resistance of most semiconductors drops with increasing temperature. Since the sintered body is impervious and nitrogen diffusivity through silicon carbide is extremely small, nitrogen does not escape even at high temperatures and the product retains N-type semiconductive properties and excellent stability of resistance through a wide temperature range, e.g. from −100° C. to 2000° C.

The present invention makes it possible to fabricate complex shaped articles of single phase polycrystalline silicon carbide ceramic which heretofore could not be manufactured or required expensive and tedious machining because of the very nature of the material. The present sintered product is useful as a resistor, ptc resistor, high temperature sensor, current limitor, and high temperature heating element.

The invention is further illustrated by the following examples wherein, unless otherwise noted, all sintering or firing was carried out at atmospheric pressure in a carbon-element resistor furnace which was always initially purged with the sintering atmosphere.

EXAMPLE 1

A carbon-rich silicon carbide power prepared by a pyrolytic process was used. Specifically, it was submicron powder composed β-silicon carbide with free carbon uniformly and intimately dispersed therein. The powder had the following characteristics.

| Spectrographic analyses | |
|---|---|
| Al ppm | 50 |
| Fe ppm | 40 |
| W ppm | 300 |
| Ca ppm | 40 |
| other metal traces Ti, Mn, Cu | |
| Chemical analyses (% by weight based on silicon carbide) | |
| Oxygen % | 0.17 |
| Boron % | <0.005 |
| Free Carbon % | 0.6 |
| Surface Area m$^2$/g | 8.0 |
| Mean average μ particle size | 0.2 |
| Crystallographic phases by DS X-ray analysis | β-SiC |

This powder was particularly satisfactory since it was composed substantially of isolated silicon carbide crystallites and contained the necessary amount of free carbon.

Amorphous elemental boron powder of submicron size was admixed with the carbon-enriched silicon carbide powder in an amount equivalent to 0.4 gram of boron per 100 g of silicon carbide in 100 cc of a 0.5% solution of aluminum stearate in benzene to form a slurry which was ball milled with 400 g ¼ inch cemented carbide balls in a plastic jar for 3 hours and then strained through a 400 Tylor mesh nylon screen. The resulting wet powder mixture was dried to remove remaining solvent. The dried powder was then ball milled for 5 hours and dry-screened through a 60 mesh sieve. The screened submicron sized powder had an average crystallite size of 0.17 micron and was pressed isostatically by a conventional wet-bag technique into rods approximately ¼ in.×7 in. having a green density of 55% of the theoretical density for silicon carbide.

The sintering atmosphere was composed of nitrogen and argon set at a rate of 3 cfh and 2 cfh, respectively, corresponding to a partial pressure of nitrogen of 0.6 atmosphere. Each rod was fired at a heating rate of 1000° C. per hour to a sintering or firing temperature 2260° C., held for 15 minutes at 2260° C., and then furnace-cooled in the sintering atmosphere to room temperature. The rods underwent 16.5% linear shrinkage during sintering and had a final density of 3.00 g/cc corresponding to 93.5% of the theoretical density for silicon carbide. The room temperature electrical resistance of one rod was 7.1Ω corresponding to a resistivity of 0.334Ω cm. This rod was metallized at the ends by copper plating and cycled in air between room temperature and 1600° C. by heating with AC current 12,000 times in about 10 minute cycles. No noticeable deterioration of the rod due to oxidation or cracking was observable and only a marginal increase in resistance was noticed after the exposure to the thermal cycling.

EXAMPLE 2

The carbon enriched β-silicon carbide powder of Example 1 was used in this example. 18 grams of boron carbide of submicron size was added to 250 grams of the powder and this was equivalent to 0.72 part of boron per 100 parts of silicon carbide. The resulting mixture was mixed with 80 cc of water, 5 cc of a 10% solution of tetramethylamonium hydroxide and 1 cc of sodium silicate solution 32 Be, and the wet mixture was milled in a plastic jar with cemented carbide balls for 8 hours.

The resulting slurry of submicron sized particles was used for slip castings into plaster-or-paris molds. Specifically, tubes 1/16"×12"×¾", open at one end and closed at the opposite end, were formed by drain casting and dried in air.

The dried castings were fired in one atmosphere nitrogen pressure at a heating rate of 1000° C. per hour to a sintering temperature of 2300° C., held for 30 minutes at 2300° C. and then furnace cooled to room temperature.

The sintered tubes had a density of 96.5% of the theoretical density for silicon carbide. The sintered tubes were gas tight as determined by helium leak testing indicating that the pores were non-interconnecting.

The electrical resistivity of one tube measured at 6 volts D.C. current was 0.8Ω cm. The resistivity of this tube was quite ohmic up to 3000 volts, i.e. no deviation in the linear voltage-current characteristic was observed.

Examples 1 and 2 are further illustrated in Table I. The materials and procedures used in Examples 3–6 were substantially the same as disclosed for Example 1 except as indicated. The powder mixture used to form the green body was submicron in size and close to the size of the mean average particle size given in Table I for the β-silicon carbide powder.

Specifically, in Example 4 a carbon enriched β-silicon carbide powder was prepared in the same manner as set forth in Example 1 and the carbon was then removed by conventional techniques. The recovered silicon carbide powder was examined and determined to be single β-phase. This β2-phase powder was used in Example 4 as well as Example 5.

In Example 5 the β-silicon carbide powder was coated with a solution of polymethylphenylene, dried, and heated to decompose the coating to produce submicron sized free carbon in an amount of 0.5%.

In Example 6, the β-silicon carbide powder was prepared as set forth in Example 4 except that it was a finer sized powder.

In Examples 3–6, rods were formed in the same manner as in Example 1 and had substantially the same size.

In all of the Examples of Table I, a heating rate of 1000° C. per hour was used to sintering temperature and the furnace was held at sintering temperature for 15 minutes to 40 minutes.

Densities in Table I are given in % of the theoretical density for silicon carbide.

Nitrogen content of each Example of Table I was determined by a standard vacuum fusion technique.

TABLE I

| Ex. No. | GREEN BODY % by wt. Boron and Free C based on 100 parts by wt. β-SiC | Mean Avg. Particle Size of β-SiC(μ) | Density % | SINTERING Atmosphere | Temperature | SINTERED PRODUCT Density % | Mean Avg. Grain Size(μ) | Microstructure | Nitrogen Content % by wt. of sintered product (± 0.1) | Electrical Resistivity Of Sintered Product |
|---|---|---|---|---|---|---|---|---|---|---|
| 1 | 0.40% Boron 0.6% Free Carbon | 0.17 | 55 | 0.6 atmosphere N₂ 0.4 atmosphere Ar | 2260° C. | 93.5 | 3.5 | Uniform tabular grains | 0.55 | 0.334 Ωcm/20° C. 0.18 Ωcm/1500° C. N-type |
| 2 | 0.72% Boron 0.6% Free Carbon | 0.17 | 62 | 1 atmosphere N₂ | 2300° C. | 96.5 | 2.2 | Very uniform, grains slightly elongated | 0.8 | 0.8 Ωcm/20° C. N-type |
| 3 | 0.40% Boron 0.6% Free Carbon | 0.17 | 55 | 0.07 atmosphere N₂ 0.93 atmosphere Ar | 2180° C. | 96.0 | — | large ideomorphic grains in a fine grained matrix | 0.14 | 1.9 × 10³ Ωcm/20° C. P-type |
| 4 | 0.36% Boron No Carbon | 0.17 | 55 | 0.07 atmosphere N₂ 0.93 atmosphere Ar | 2180° C. | 62 | n.d. | n.d. | n.d. | >10³ Ωcm/20° C. |
| 5 | 0.12% Boron 0.50% Free Carbon produced in situ from polymethylphenylene | 0.17 | 55 | 0.07 atmosphere N₂ 0.93 atmosphere Ar | 2180° C. | 69 | n.d. | n.d. | n.d. | >10³ Ωcm/20° C. |
| 6 | 1.0% Boron 1.0% Free Carbon (acetylene black) | 0.11 | 51 | 1 atmosphere N₂ | 2180° C. | 91.5 | 1.0 | uniform equiaxed grains | n.d. | 3.5 Ωcm/20° C. N-type |

Examples 1, 2 and 6 illustrate the present invention. Specifically, they show that the sintered product produced by the present process has the required high density as well as exhibits N-type semiconductivity. The sintered product of Example 2 was determined to have an electrical resistance with a positive temperature coefficient at temperatures ranging from about 800° C. and up. Example 6 also shows that a lower sintering temperature can be used when the green body is formed from a powder mixture of smaller particle size.

The sintered products of Examples 1, 2 and 6 were examined metallographically. Each product had a microstructure which was fine-grained and substantially uniform and had pores which were substantially non-interconnecting. Also, particles of free carbon of submicron size were distributed substantially uniformly throughout each microstructure.

In Example 3 the partial pressure of nitrogen was too low to produce a sintered product of N-type semiconductivity. In Example 4 no free carbon was used, and therefore, a sintered product of low density was produced. In Example 5 boron was used in an amount insufficient to produce a product of the required density.

EXAMPLE 7

This example illustrates the effect of partial pressure of nitrogen during sintering on the resistivity of the resulting sintered body. The starting silicon carbide powder was prepared by pyrolysis of trichloromethylsilane and was extremely pure and was submicron in size. 5 grams of amorphous boron of submicron size and 5 grams acetylene black of submicron size were admixed with 1000 grams of the silicon carbide powder, and the resulting mixture was dispersed in water by ball milling for 5 hours at room temperature. After filtering off the water and drying the mixture, the resulting cake was mixed with 19% by weight, based on the amount of cake, of a 4% aqueous solution of a water soluble polyacrylate in a sigma blender into a paste and extruded into rods 12 inches long and 0.4 inch in diameter. The rods were air dried.

The sintering atmosphere was composed of nitrogen and argon, and one run was carried out at 200 torr $N_2$ (0.26 atmosphere), a second run at 400 torr $N_2$ (0.53 atmosphere), and a third run at 600 torr $N_2$ (0.8 atmosphere). Specifically, each rod was fired at a heating rate of 1000° C. per hour to a sintering or firing temperature of 2230° C., held for 30 minutes at 2230° C., and then furnace-cooled in the sintering atmosphere to room temperature. The rods underwent about 16% linear shrinkage during sintering and had a final density of 3.00 g/cc corresponding to 94% of the theoretical density for silicon carbide. Each sintered rod had a diameter of 0.286 inch.

Electrical resistance was measured on 1 inch long segments of the sintered rods at temperatures ranging from room temperature, i.e. 20° C., up to 700° C. Heating of each rod segment was carried out in a furnace in a nitrogen atmosphere to protect the copper electrical contacts plated at opposite ends of each rod segment, and the resistance measured while at temperature in the furnace.

The results in terms of resistivity in ohm centimeters are shown in FIG. 1. FIG. 1 shows that the pressure of nitrogen in the sintering atmosphere is a critical parameter which controls the resulting resistivity and that with increasing partial pressure of nitrogen the resistivity decreases.

EXAMPLE 8

The sintered rods of this Example were of the same composition and were prepared in the same manner as disclosed in Example 7 except that one rod was sintered at 2200° C. and the other at 2250° C., and each was sintered in an atmosphere composed of argon and nitrogen wherein the nitrogen partial pressure was 600 torr.

The rod sintered at 2200° C. had a density of 90.2%, and the rod sintered at 2250° C. had a density of 93.1%.

Each sintered rod was 3 inches long and 0.25 inch in diameter. The electrical resistance of each rod was measured in air at a temperature ranging from 20° C. to 1400° C. Heating of each rod to temperature was carried out by passing AC current through it by means of copper water-cooled electrical contacts at opposite ends thereof. However, since the rods were not heated uniformly because of the heat lost in the electrical contacts, resistance is given rather than resistivity.

FIG. 2 shows that the resistance of each rod dropped as its temperature was increased from 20° C. up to about 800° C. and increased at higher temperatures. FIG. 2 also shows that the increased sintering temperature increased the resistance of the sintered rod.

What is claimed is:

1. A method of producing an N-type semiconductor having an electrical resistivity at 20° C. ranging from 10 ohm centimeters to $10^{-2}$ ohm centimeter and an electrical resistance that shows a positive temperature coefficient at temperatures ranging from about 800° C. to about 2000° C. and which retains N-type semiconducting properties at temperatures ranging from about $-100°$ C. to 2000° C. which comprises providing a substantially homogeneous mixture of a submicron powder consisting essentially of $\beta$-silicon carbide, an amount of boron additive selected from the group consisting of boron and boron carbide equivalent to about 0.3 part to 3.0 parts by weight of boron based on 100 parts by weight of said $\beta$-silicon carbide, and an amount of a carbonaceous additive selected from the group consisting of free carbon and a carbonaceous organic material equivalent to 0.1 part to 1.0 part by weight of free carbon based on 100 parts by weight of said $\beta$-silicon carbide, said carbonaceous organic material completely decomposing at a temperature ranging from about 50° C. to 1000° C. to said free carbon and gaseous product of decomposition, shaping the mixture into a green body, and sintering the green body at a temperature ranging from about 1280° C. to 2300° C. in a sintering atmosphere which ranges from atmospheric pressure to superatmospheric pressure of 5 atmospheres and which contains nitrogen from a partial pressure of $10^{-1}$ atmosphere to a pressure of 5 atmospheres producing a sintered body having a density of at least 90% of the theoretical density for silicon carbide and having pores which are substantially non-interconnecting.

2. The method according to claim 1 wherein the sintering atmosphere is at atmospheric pressure and the nitrogen ranges from a partial pressure of $10^{-1}$ atmosphere to a pressure of one atmosphere.

* * * * *